US006694937B2

(12) United States Patent
Okuma et al.

(10) Patent No.: US 6,694,937 B2
(45) Date of Patent: Feb. 24, 2004

(54) ENGINE STARTING SYSTEM FOR MOTORCYCLE

(75) Inventors: Takanori Okuma, Saitama (JP); Yuji Noguchi, Saitama (JP); Tatsunori Shimoda, Saitama (JP); Minoru Akazu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/141,967

(22) Filed: May 10, 2002

(65) Prior Publication Data

US 2002/0189565 A1 Dec. 19, 2002

(30) Foreign Application Priority Data

Jun. 13, 2001 (JP) ........................................ 2001-178312

(51) Int. Cl.[7] .............................................. F02N 17/00
(52) U.S. Cl. .................................................. 123/179.18
(58) Field of Search ........................ 123/179.18, 179.16; 74/500.5, 501.5 R, 501.6, 502.2, 495, 502.6

(56) References Cited

U.S. PATENT DOCUMENTS 3,767,173 A * 10/1973 Ishi ........................ 123/179.16
3,929,116 A * 12/1975 Peterson ................... 123/182.1

FOREIGN PATENT DOCUMENTS

JP 2000-220525 8/2000
JP 2003003908 A * 1/2003 ............ F02M/1/04

* cited by examiner

Primary Examiner—Henry C. Yuen
Assistant Examiner—Arnold Castro
(74) Attorney, Agent, or Firm—Birch, Stewart, Kolasch & Birch, LLP

(57) ABSTRACT

A hot starter cable extends from a hot starter valve and an end of the hot starter cable is connected to a hot starter lever provided in the vicinity of a handle so that the hot starter valve can be opened by operating the hot starter lever. It is possible to easily operate the hot starter lever while the operator always keeping a hold on the handle, so that the operability at the time of restarting the engine can be further enhanced. In addition, since the hot starter lever is present within the visual field of the driver, the hot starter lever can be securely operated.

15 Claims, 7 Drawing Sheets

ENGINE STARTING SYSTEM FOR MOTORCYCLE

BACKGROUND OF THE INVENTION

CROSS-REFERENCE TO RELATED APPLICATIONS

The present application claims priority under 35 USC 119 to Japanese Patent Application No. 2001-178312 filed on Jun. 13, 2001 the entire contents thereof is hereby incorporated by reference.

1. Field of the Invention

The present invention relates to an engine starting system by which operability at the time of restarting an engine is enhanced and the operation can be securely performed.

2. Description of Background Art

An engine starting system, particularly one in which the restartability during a condition where the engine has been warmed up, is known for example, as described in Japanese Patent Laid-open No. 2000-220525 entitled "Carburetor Starting System."

In FIG. 1 of Japanese Patent Laid-open No. 2000-220525, a starting system is described in which a starting system main body 1 (the symbols described in the above publication are used here) is provided with a hot starting air passage 10 whose upstream side is in communication with the atmospheric air and whose downstream side is in communication with an intake passage on the engine side of a throttle valve for opening and closing the intake passage of a carburetor main body. A second starter valve 11 is provided at an intermediate portion of the hot starting air passage 10 with a knob fitted on the second starter valve 11.

In the starting system, by opening the second starter valve 11 to supply outside air into the intake passage of the engine, the rich fuel-air mixture in the engine combustion chamber at a hot time is thinned to be an easily ignitable fuel-air mixture ratio, thereby enhancing the restartability of the engine.

According to Japanese Patent Laid-open No. 2000-220525, in order to open the second starter valve 11, it is necessary to put the hand off the handle and bring the hand to the knob of the carburetor disposed on the lower side of the vehicle body frame and the fuel tank. Therefore, it is necessary to look into the knob from above or to grope for the knob. Thus, there is a demand for an enhancement in the operatability at the time of restarting.

Some carburetors are provided with a choke knob for enhancing the startability at the time when the engine is cold. In the case where both the choke knob and the knob for opening the second starter valve 11 are provided, there is also a risk of mistaking one knob for another at the time of operating one of the two knobs.

SUMMARY AND OBJECTS OF THE INVENTION

Accordingly, it is an object of the present invention to improve an engine starting system, and thereby to enhance operability at the time of restarting to enable assured operation.

In order to attain the above object, the present invention is directed to a motorcycle comprising a choke used at the time of starting in a cold condition and a hot starter valve used at the time of restarting an engine stopped during operation which are annexed to a carburetor. An operational cable extends from the hot starter valve. An end of the operational cable is connected to a hot starter lever provided in the vicinity of a handle so that the hot starter valve can be opened by operating the hot starter lever.

Since the hot starter valve is connected to the hot starter lever provided in the vicinity of the handle through the operational cable, the hot starter lever can be easily operated while always keeping hold of the handle. As compared to the case of putting an operator's hand off the handle and operating a knob as, for example, in the related-art structure wherein the hot starter valve is opened by operating the knob fitted to the carburetor, operability at the time of restarting the engine can be further enhanced according to the present invention.

In addition, where both a knob for a choke and a knob for a hot starter valve as in the related art are provided on the carburetor, there is the risk that the operator would operate the knob for the choke while intending to operate the knob for the hot starter valve. In contrast, according to the present invention, the hot starter lever is present within the visual field of the driver, so that the hot starter lever can be securely operated.

The present invention includes a hot starter lever that is swingably fitted to a swing shaft for a clutch lever provided on a handle.

Since the hot starter lever is present in proximity to the clutch lever, the hot starter lever can be operated while operating the clutch lever. Therefore, the engine can be started while gears are meshed, and quick restarting can be performed.

Since the swing shaft is used in common for both the hot starter lever and the clutch lever, the number of component parts can be reduced, and parts cost can be reduced.

The present invention is directed to a position for leading out the operational cable for the carburetor that is provided on the upper side of a choke knob. It is possible to obviate interference between the operational cable and the choke knob.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
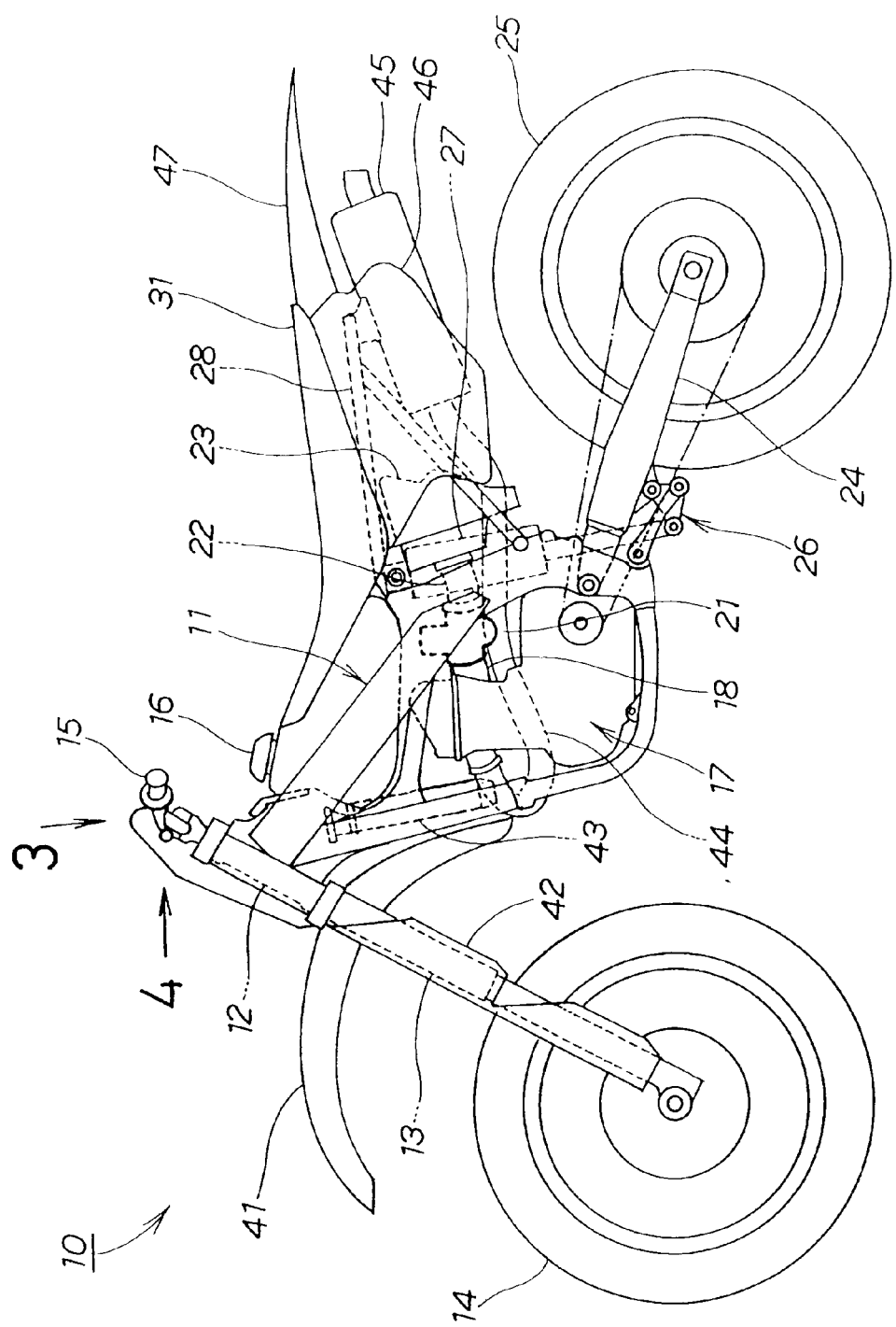
FIG. 1 is a side view of an motorcycle provided with an engine starting system according to the present invention.

A mode for carrying out the present invention will now be described below based on the accompanying drawings. FIG. 1 is a side view of an motorcycle provided with an engine starting system according to the present invention. The motorcycle 10 is a vehicle having a construction in which a front fork 13 is steerably fitted to a head pipe 12 provided at the front end of a vehicle body frame 11. A front wheel 14 is fitted to the lower end of the front fork 13. A handle 15 is fitted to an upper portion of the front fork 13. A fuel tank 16 and an engine 17 are fitted to the vehicle body frame 11. A carburetor 21 is fitted to the engine 17 through an intake pipe 18 with an air cleaner 23 is fitted to the carburetor 21 through a connecting tube 22. A rear fork 24 is swingably fitted to a rear lower portion of the vehicle body frame 11 with a rear wheel 25 fitted to the rear end of the rear fork 24. The lower end of a rear cushion unit 27 is fitted to an intermediate portion of the rear fork 24 through a link mechanism 26. The upper end of the rear shock absorber 27 is fitted to a seat frame 28 constituting the vehicle body frame 11 with a seat 31 fitted to the seat frame 28.

The carburetor 21 and the handle 15 are portions at which the starting system according to the present invention is provided.

A front fender 41 is provided adjacent to a front fork cover 42 and a radiator 43. An exhaust pipe 44 is connected to a muffler 45 with a rear cover 46 and a rear fender 47 being disposed adjacent thereto.

Figure 2:
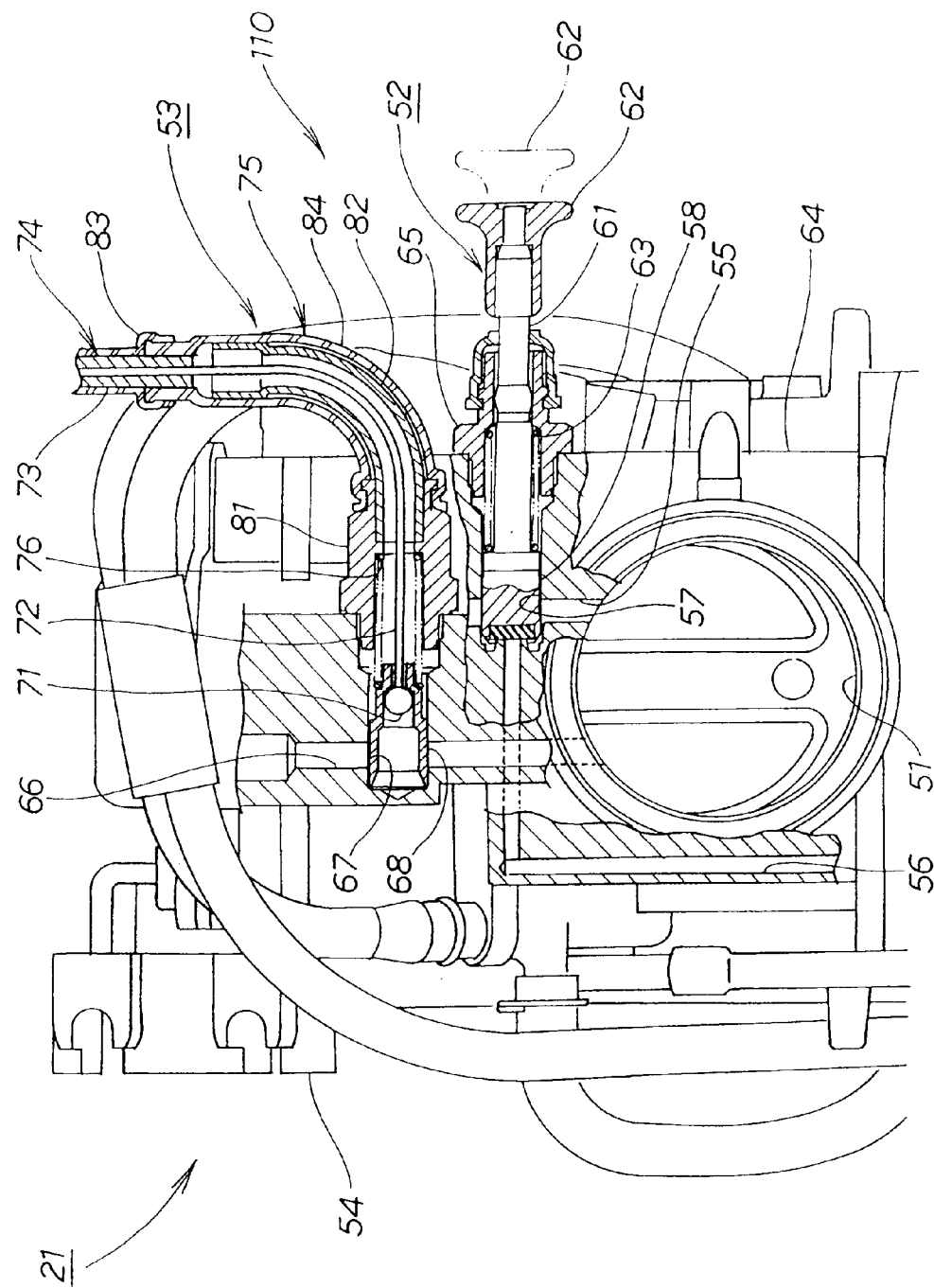
FIG. 2 is an illustration of a carburetor at which the starting system according to the present invention is provided.

FIG. 2 is an illustration of the carburetor wherein the starting system according to the present invention is provided. The carburetor 21 is provided with an auto-by starter mechanism 52 as a choke for supplying a rich fuel-air mixture into a main bore 51 to thereby enhance the startability of the engine in a cold condition, namely, when the engine is cold. A hot starter mechanism 53 is provided for supplying air into the main bore 51 to thereby thin the rich fuel-air mixture in the engine combustion chamber to an easily ignitable fuel-air mixture ratio at the time of restarting the engine which is stopped and is in a warm condition. A throttle cable fitting portion 54 is provided for fitting a throttle cable (not shown) for opening and closing a throttle valve (not shown).

The auto-by starter mechanism 52 comprises an auto-by starter passage 55 with an inlet that opens into the main bore 51 of the carburetor 21 on the upstream side (air cleaner side) of the throttle valve provided in the main bore 51 and includes an outlet that opens into the main bore 51 on the downstream side (engine side) of the throttle valve. A fuel supply passage 56 is provided with one end that is provided at an intermediate portion of the auto-by starter passage 55 and the other end is in communication with a float chamber (not shown) through a jet for restricting the flow rate of a fuel. A valve chamber 57 is provided at a connecting portion of the auto-by starter passage 55 and the fuel supply passage 56. An auto-by starter valve 58 is movably contained in the valve chamber 57. A rod 61 is fitted to the auto-by starter valve 58 with a choke knob 62 as a choke fitted to the tip end of the rod 61. A spring 63 is provided for pressing the auto-by starter valve 58 to the side for closing the valve with a guide member 65 fitted to a carburetor main body 64 so as to guide the rod 61.

When the choke knob 62 is pulled to the position indicated by the imaginary lines, the auto-by starter valve 58 is opened through the rod 61 and air flows in the auto-by starter passage 55 due to a negative pressure in the main bore 51. Attendant on the flow of air, the fuel in the float chamber is sucked into the fuel supply passage 56 through the jet. The air and the fuel form a rich fuel-air mixture, which is jetted into the main bore 51.

The hot starter mechanism 53 includes a hot starter passage 66 having an inlet that is in communication with the atmospheric air side and an outlet that is opened into the main bore 51 on the downstream side of the throttle valve. A valve chamber 67 is provided at an intermediate portion of the hot starter passage 66 with a hot starter valve 68 movably contained in the valve chamber 67. An inner wire 72 is connected to the hot starter valve 68 through a ball 71. An outer cable 73 is provided for covering the outside of the inner wire 72. A fitting member 75 is fitted to the carburetor 21 with a hot starter cable 74 as an operational cable consisting of the inner wire 72 and the outer cable 73, and a spring 76 for pressing the hot starter valve 68 to the side for closing the valve.

The hot starter cable 74 is a member extended to the handle 13 (See FIG. 1).

The fitting member 75 includes a base portion 81 screw-connected to the carburetor main body 64 with a J-shaped J-pipe 82 fitted to the base portion 81 and a covering portion 84 covering the outside of the J-pipe 82. An end portion is fitted to the outer cable 73 by an end portion member 83 that is provided on the upper side of the choke knob 62.

Figure 3:
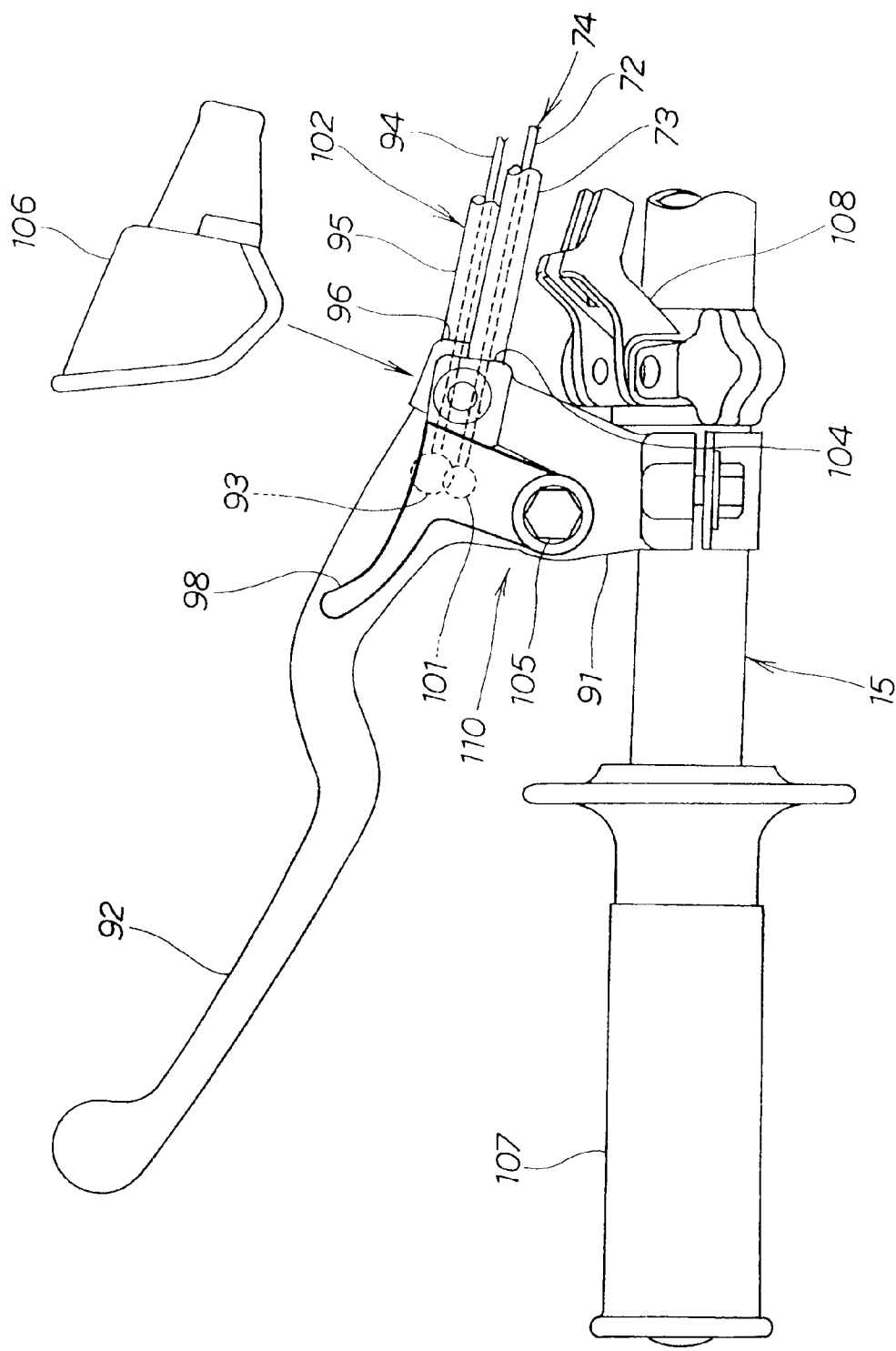
FIG. 3 is a view taken along arrow 3 of FIG. 1.

FIG. 3 is a view taken along arrow 3 of FIG. 1, illustrating a lever bracket 91 that is fitted to the handle 15. A clutch lever 92 is swingably fitted to the lever bracket 91 with an inner wire 94 fitted to the clutch lever 92 through an end portion fitting piece 93. An end portion of an outer cable 95 covers the inner wire 94 and is supported by a first cable support portion 96 of the lever bracket 91. A hot starter lever 98 for opening and closing the above-mentioned hot starter valve 68 (See FIG. 2) is swingably fitted to the lever bracket 91. The above-mentioned inner wire 72 of the hot starter cable 74 is fitted to the hot starter lever 98 through an end portion fitting piece 101. The inner wire 94 connected to the clutch lever 92 and the outer cable 95 constitute a clutch cable 102.

A second cable support portion 104 is provided for supporting an end portion of the above-mentioned outer cable 73. A bolt 105 functions as a swing shaft for the clutch lever 92 and the hot starter lever 98. A rubber boot 106 is provided for covering the surroundings of the first and second support portions 96 and 104 with a grip 107 being disposed adjacent thereto.

A decompression lever bracket 108 is provided for fitting a decompression lever for releasing the pressure inside a fuel chamber by, for example, forcibly opening an exhaust valve so as to alleviate an operating force in the case of starting the engine by a kick pedal.

Figure 4:
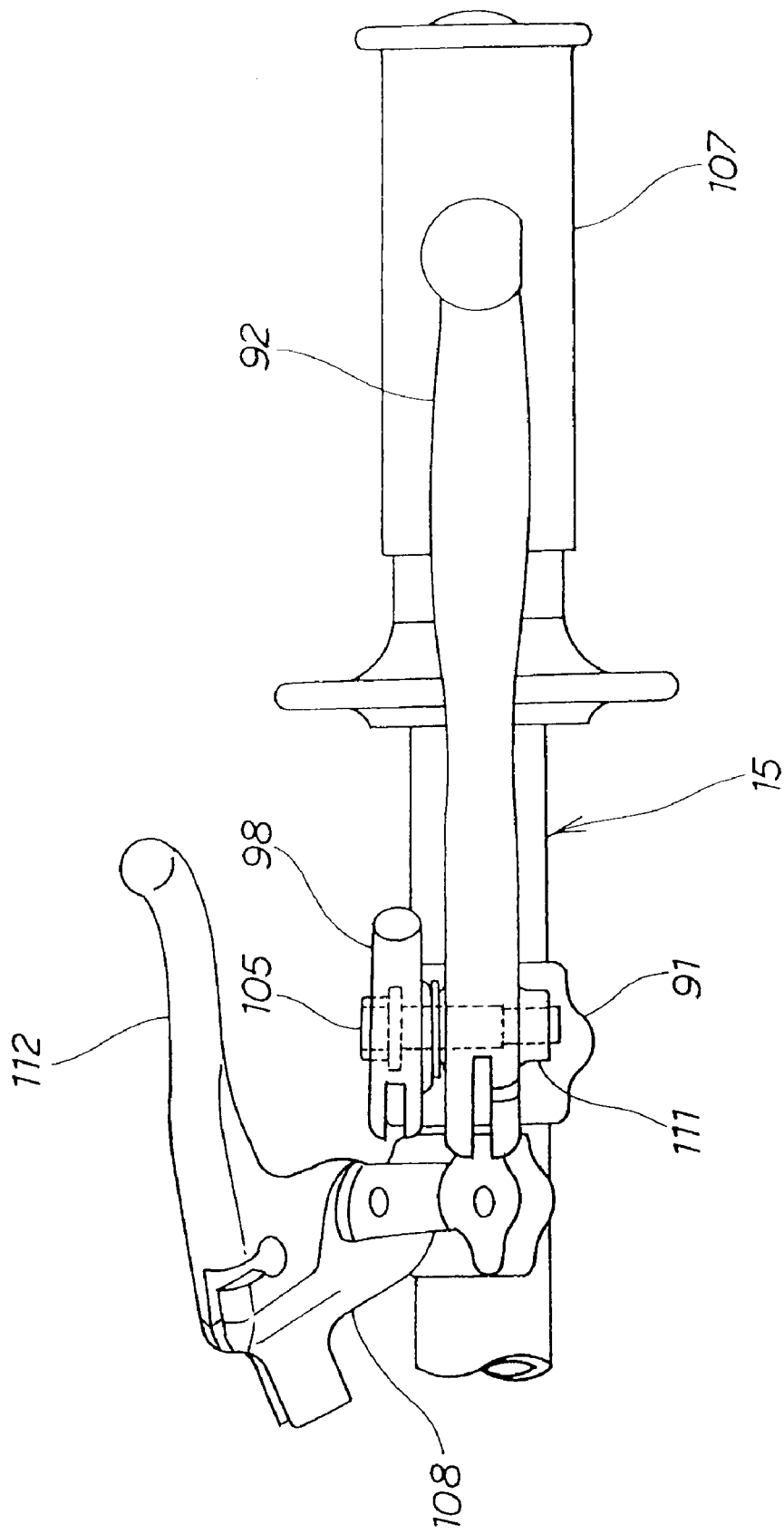
FIG. 4 is a view taken along arrow 4 of FIG. 1.

FIG. 4 is a view taken along arrow 4 of FIG. 1, that illustrates the hot starter lever 98 that is swingably fitted to the stepped-type bolt 105 that functions as the swing shaft for the clutch lever 92. A nut 111 is screw-connected to the bolt 105 with a decompression lever 112 mounted adjacent thereto.

The auto-by starter mechanism 52 and the hot starter mechanism 53 are described with reference to FIG. 2 above and the hot starter lever 98 and the bolt 105 described referring to FIG. 3 constitute the engine starting system 110 according to the present invention.

Figure 5:
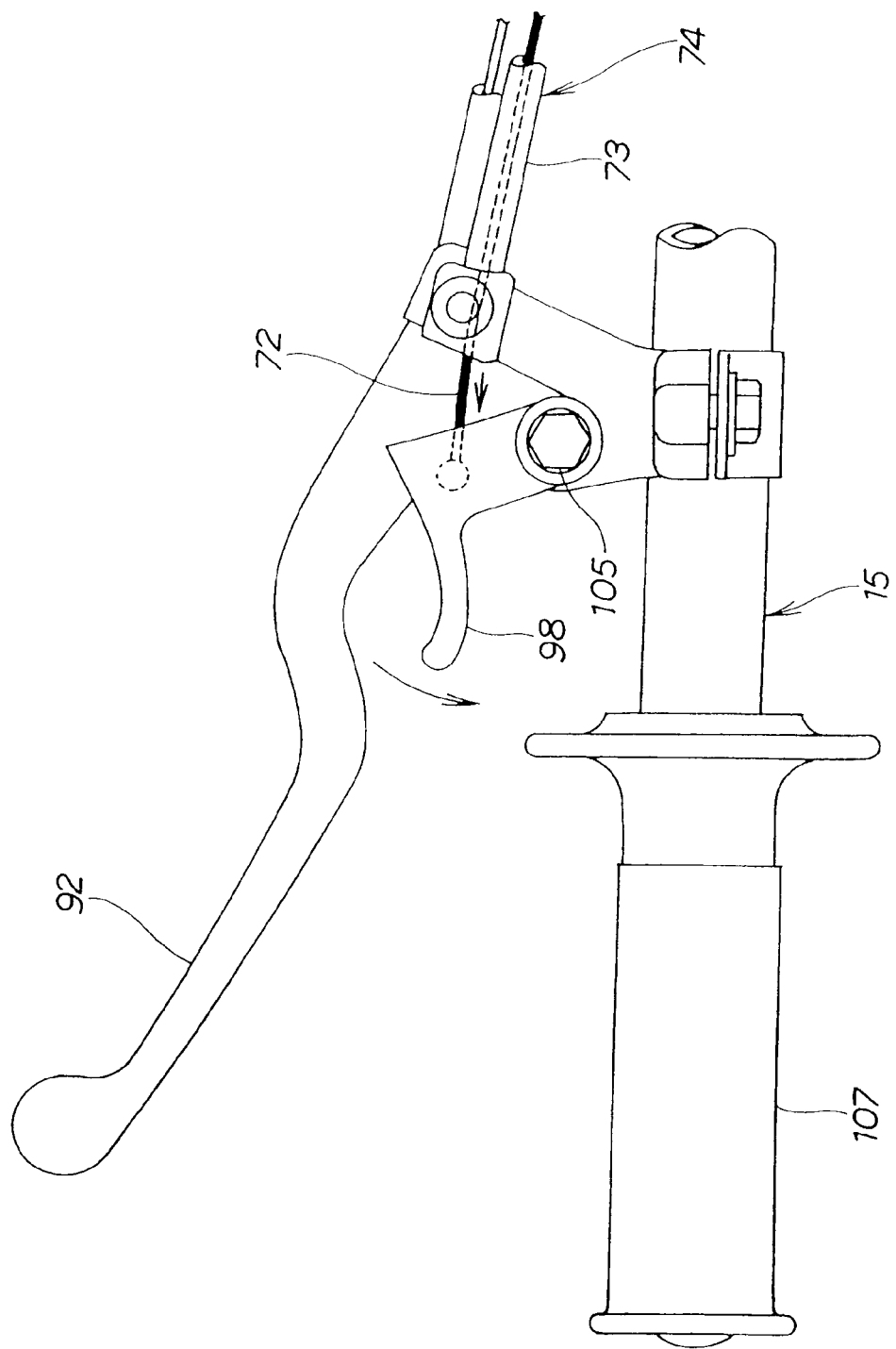
FIG. 5 is a first operational view illustrating the action or operation of the engine starting system according to the present invention.

Now, the action or operation of the engine starting system 110 described above will be described. FIG. 5 is a first operational view illustrating the action or operation of the engine starting system according to the present invention.

For example, when the engine is stopped during operation, the combustion chamber of the engine which has been warmed up is filled with a rich fuel-air mixture containing the fuel evaporated from the combustion chamber wall being at a high temperature. If restarting is tried in this condition, the mixture of gas is not easily ignited because the fuel concentration is too high.

Therefore, to restart in such a condition when the engine is hot, first, the speed change gear is set into neutral, and the hot starter lever 98 is swung by a finger as indicated by an arrow in the FIG. 5.

By this, the inner wire 72 connected to the hot starter lever 98 is pulled. (Here, the inner wire 72 is indicated by the thick solid line.)

Figure 6:
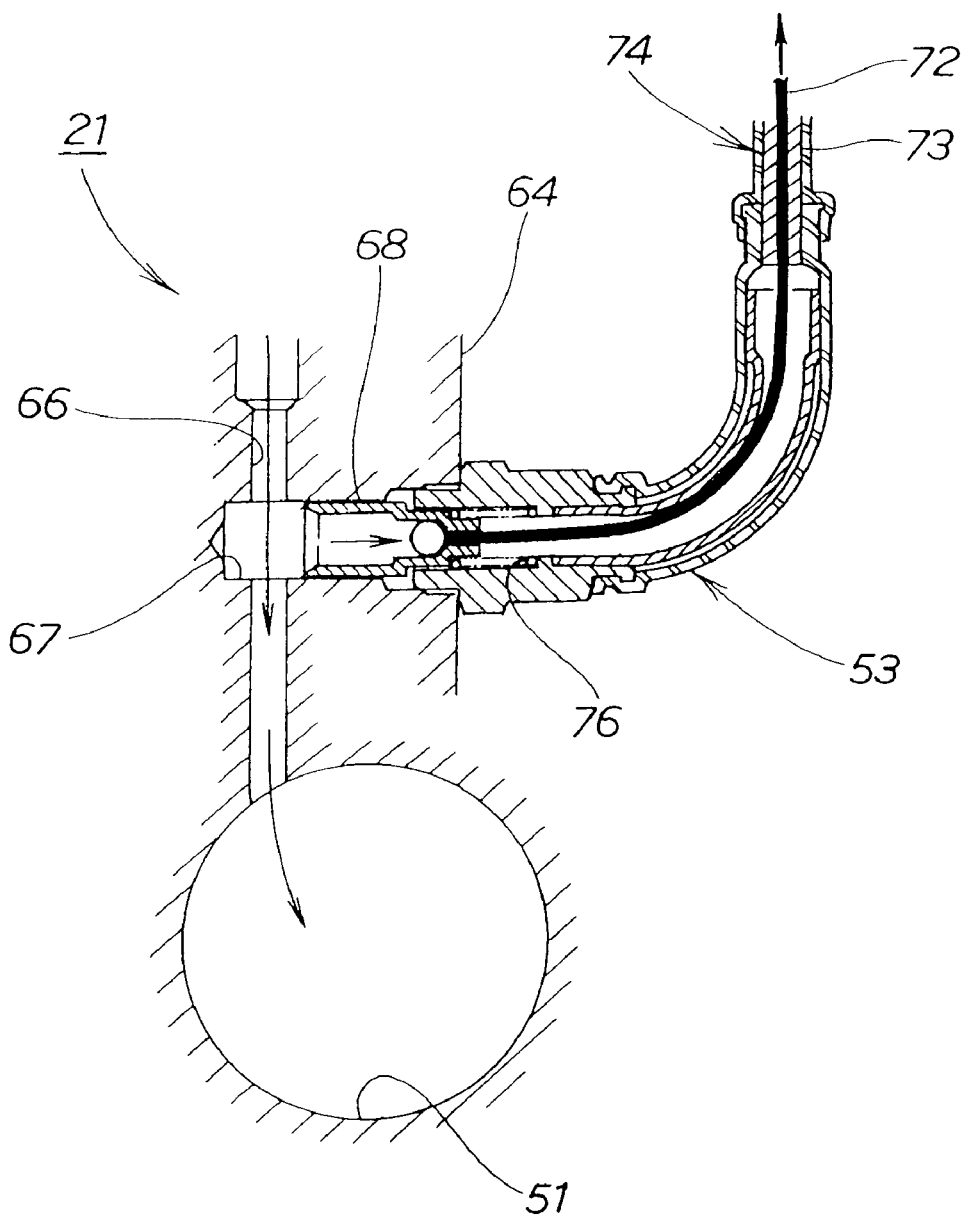
FIG. 6 is a second operational view illustrating the action or operation of the engine starting system according to the present invention.

FIG. 6 is a second operational view illustrating the action or operation of the engine starting system according to the present invention.

With the inner wire 72 pulled, the hot starter valve 68 connected to the inner wire 72 opens the hot starter passage 66.

As a result, air flows through the hot starter passage 66 into the main bore 51, whereby the rich fuel-air mixture in the combustion chamber is thinned to make an easily ignitable fuel-air mixture ratio. Therefore, the thinned fuel-air mixture is easily ignited, whereby the engine is started.

After the engine is started, the operator's finger is released from the hot starter lever 98 shown in FIG. 5, upon which the hot starter valve 68 is moved in the direction opposite to the arrow in FIG. 5 by an elastic force of the spring 76 shown in FIG. 6, to close the hot starter passage 66.

As a result, the flow of air into the main bore 51 stops. Thus, with the finger released from the hot starter lever 98, the hot starter lever 98 is returned to its original position, and, therefore, there is no risk that the hot starter lever 98 might mistakenly be left unreturned.

Figure 7:
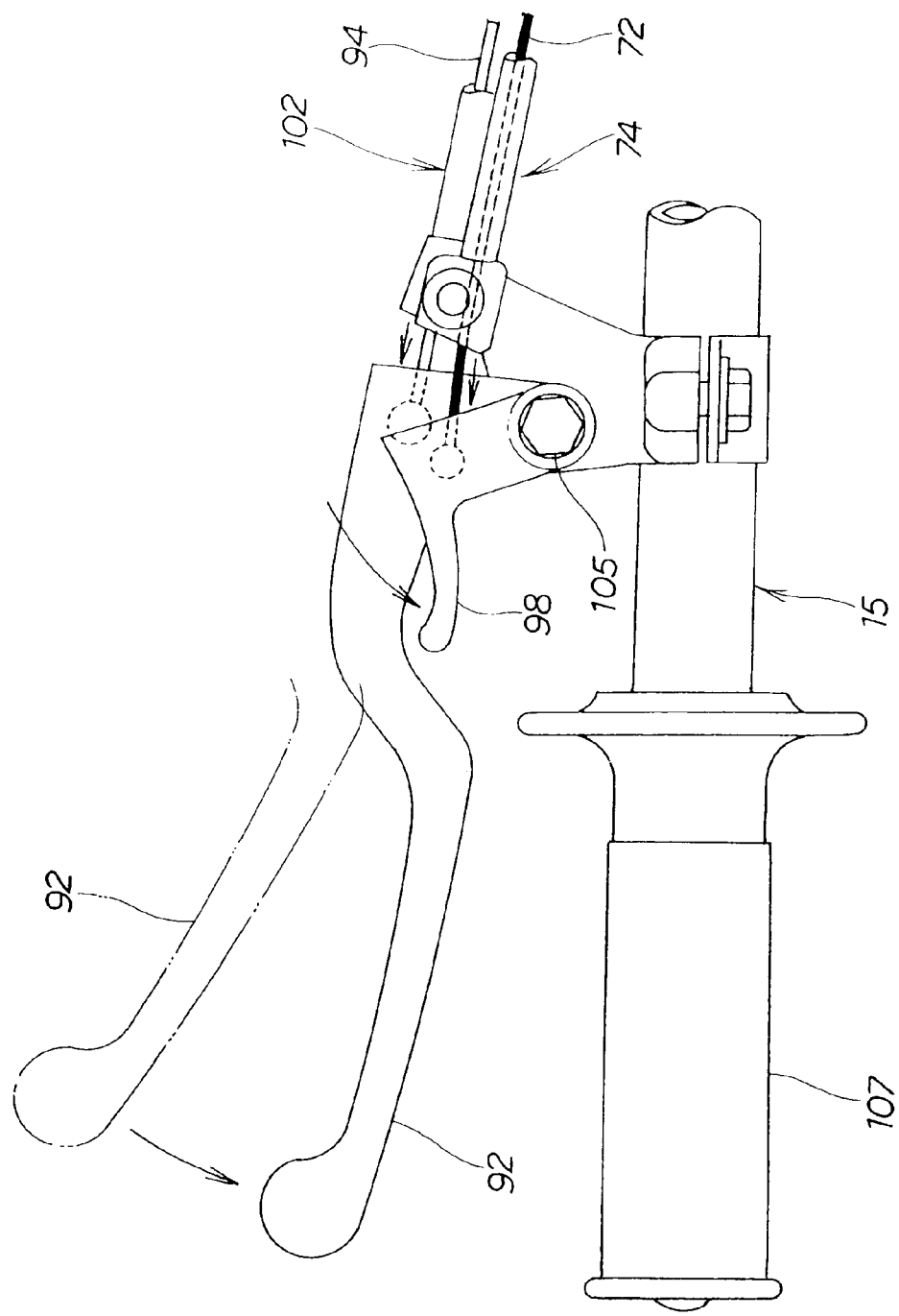
FIG. 7 is a third operational view illustrating the action or operation of the engine starting system according to the present invention.

FIG. 7 is a third operational view illustrating the action or operation of the engine starting system according to the present invention.

For example, when the engine of a racing vehicle is stopped during racing, the hot starter lever 98 is swung by a finger while keeping the grasp of the clutch lever 92 in the condition where the speed change gear is meshed, as shown in FIG. 7, and the kick pedal is kicked to start the engine, whereby restarting is immediately achieved, and racing can be continued.

As has been described referring to FIGS. 1 to 3 above, the present invention is characterized firstly in that, in the motorcycle 10 includes the choke knob 62 used at the time of cold starting of the engine 17 and the hot starter valve 68 used at the time of restarting the engine 17 that is stopped during an operation. The hot starter cable 74 extends from the hot starter valve 68 and an end of the hot starter cable 74 is connected to the hot starter lever 98 provided in the vicinity of the handle 15 so that the hot starter valve 68 can be opened by operating the hot starter lever 98.

With the hot starter valve 68 connected through the hot starter cable 74 to the hot starter lever 98 provided in the vicinity of the handle 15, it is possible to easily operate the hot starter lever 98 while the operator always keeps a hold on the handle 15. Therefore, as compared to the case of putting the hand off the handle and operating the knob as, for example, in the related-art structure wherein the hot starter valve is opened by a knob fitted to the carburetor, operability at the time of restarting the engine can be further enhanced according to the present invention.

Besides, where both the knob for the choke and the knob for the hot starter valve as in the related art are fitted to the carburetor, there is the risk that the knob for the choke might be operated although it is intended to operate the knob for the hot starter valve. In contrast, according to the present invention, the hot starter lever 98 is present within the visual field of the driver, so that the hot starter lever 98 can be securely operated.

The present invention is characterized secondly in that the hot starter lever 98 is swingably fitted to the bolt 105 functioning as the swing shaft for the clutch lever 92 provided on the handle 15.

Since the hot starter lever 98 is present in proximity to the clutch lever 92, it is possible to operate the hot starter lever 98 while operating the clutch lever 92, so that it is possible to restart the engine 17 while the gears are meshed, and to achieve quick restarting.

In addition, since the bolt 105 is used in common for both the hot starter lever 98 and the clutch lever 92, the number of component parts can be reduced, and parts cost can be reduced.

The present invention is characterized thirdly in that the position of leading out the hot starter cable 74 at the carburetor 21, namely, the position of the fitting member 75 is provided on the upper side of the choke knob 62. With the fitting member 75 for the hot starter cable 74 disposed on the upper side of the choke knob 62, it is possible to obviate the interference between the hot starter cable 74 and the choke knob 62.

While the hot starter lever is fitted coaxially with the swing shaft for the clutch lever in the present invention, in the case where it is difficult to fit the hot starter lever coaxially with the clutch lever due to the shape of the clutch lever or the bracket for the clutch lever, a structure may be adopted in which a bracket for the hot starter lever is fitted to the handle and the hot starter lever is fitted to the bracket.

The location of the hot starter lever is not limited to the clutch lever side of the handle. Namely, the hot starter lever may be disposed on the right side of the handle where a front brake lever and a throttle grip are provided.

Further, for example, when an auto-decompression device not including an operating lever for decompression is provided on the motorcycle, it is possible to obviate the risk that the operating lever for decompression might mistakenly be operated at the time of operating the hot starter lever to avoid a malfunction.

The present invention constituted as described above displays the following effects. The engine starting system for a motorcycle according to the present invention has a constitution in which the operational cable is extended from the hot starter valve, and an end of the operational cable is connected to the hot starter lever provided in the vicinity of the handle so that the hot starter valve can be opened by operating the hot starter lever. Therefore, it is possible for the operator to easily operate the hot starter lever while always keeping hold of the handle, and operability at the time of restarting the engine can be further enhanced.

In addition, since the hot starter lever is present within the visual field of the operator, the hot starter lever can be operated securely.

The engine starting system for a motorcycle according to the present invention has a constitution in which the hot starter lever is swingably fitted to the swing shaft for the clutch lever provided on the handle. Therefore, since the hot starter lever is present in the proximity to the clutch lever, it is possible to operate the hot starter lever while operating the clutch lever, so that it is possible to restart the engine while the gears are meshed, and to achieve quick restarting. Besides, since the swing shaft is used in common for both the hot starter lever and the clutch lever, the number of component parts can be reduced, and parts cost can be reduced.

The engine starting system for a motorcycle according to the present invention has a constitution in which the position of leading out the operational cable at the carburetor is provided on the upper side of the choke knob. Therefore, it is possible to obviate interference between the operational cable and the choke knob.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine starting system for a motorcycle comprising:
    a choke used at the time of starting in a cold condition; and
    a hot starter valve used at the time of restarting an engine stopped during operation;
    wherein an operational cable extends from said hot starter valve, a leading out position of said operational cable being provided on an upper side of a choke knob, and an end of said operational cable being connected to a hot starter lever provided in the vicinity of a handle so that said hot starter valve can be opened by operating said hot starter lever.

2. The engine starting system for an motorcycle as set forth in claim 1, wherein said hot starter lever is pivotally mounted relative to a swing shaft for a clutch lever provided on said handle.

3. The engine starting system for an motorcycle as set forth in claim 1, and further including a hot starter passage having an inlet being in communication with atmospheric air and an outlet that is in communication with a main bore of the engine, said hot starter valve being disposed in said hot starter passage for selectively communicating the atmospheric air with said main bore of the engine.

4. The engine starting system for an motorcycle as set forth in claim 3, further including biasing means for normally biasing said hot starter valve to close said hot starter passage.

5. The engine starting system for an motorcycle as set forth in claim 1, wherein said operational cable includes an outer cable and an inner wire, said outer cable extending from said hot starter lever to adjacent to said hot starter valve for covering said operational cable.

6. The engine starting system for an motorcycle as set forth in claim 1, further including a fitting member for operatively connecting the operational cable to a carburetor, said fitting member including a J-shaped pipe for guiding said operational cable relative to said hot starter valve.

7. The engine starting system for an motorcycle as set forth in claim 1, wherein said hot starter valve admits a predetermined quantity of air to said engine during a restarting of the engine for thinning the fuel-air mixture.

8. An engine starting system comprising:
    an auto-by starter passage including an inlet in communication with a main bore of a carburetor on an upstream side thereof and an outlet in communication with the main bore of the carburetor at a downstream side thereof;
    a fuel supply passage having a first end in communication with said auto-by starter passage and a second end in communication with a float chamber of an engine;
    an auto-by starter valve operatively connected to said auto-by starter passage for use at the time of starting the engine in a cold condition; and
    a hot starter passage including an inlet in communication with atmosphere and an outlet in communication with the main bore;
    a hot starter valve operatively connected to said hot starter passage for use at the time of restarting the engine stopped during operation; and
    an operational cable including a first end operatively connected to a hot starter lever provided in the vicinity of a handle and a second end operatively connected to said hot starter valve, wherein said hot starter valve is manually operated by actuating said hot starter lever to impart movement to said hot starter valve.

9. The engine starting system for an motorcycle as set forth in claim 8, wherein said hot starter lever is pivotally mounted relative to a swing shaft for a clutch lever provided on said handle.

10. The engine starting system for an motorcycle as set forth in claim 8, wherein a position of leading out of said operational cable is provided on an upper side of the auto-by starter valve.

11. The engine starting system for an motorcycle as set forth in claim 8, wherein said hot starter valve selectively, manually communicates the atmospheric air with said main bore of the engine.

12. The engine starting system for an motorcycle as set forth in claim 11, further including biasing means for normally biasing said hot starter valve to close said hot starter passage.

13. The engine starting system for an motorcycle as set forth in claim 8, wherein said operational cable includes an outer cable and an inner wire, said outer cable extending from said hot starter lever to adjacent to said hot starter valve for covering said operational cable.

14. The engine staffing system for an motorcycle as set forth in claim 8, further including a fitting member for operatively connecting the operational cable to a carburetor, said fitting member including a J-shaped pipe for guiding said operational cable relative to said hot starter valve.

15. The engine starting system for an motorcycle as set forth in claim 8, wherein said hot starter valve admits a predetermined quantity of air to said engine during a restarting of the engine for thinning the fuel-air mixture.

* * * * *